No. 661,672. Patented Nov. 13, 1900.
G. H. F. SCHRADER.
TIRE OR OTHER VALVE.
(Application filed July 31, 1897.)

(No Model.)

WITNESSES:
Fred White
Thomas F. Wallace

INVENTOR:
George H. F. Schrader,
By his Attorneys,

UNITED STATES PATENT OFFICE.

GEORGE H. F. SCHRADER, OF NEW YORK, N. Y.

TIRE OR OTHER VALVE.

SPECIFICATION forming part of Letters Patent No. 661,672, dated November 13, 1900.

Application filed July 31, 1897. Serial No. 646,604. (No model.)

*To all whom it may concern:*

Be it known that I, GEORGE H. F. SCHRADER, a citizen of the United States, residing in the city, county, and State of New York, have invented certain new and useful Improvements in Tire or other Valves, of which the following is a specification.

This invention relates to air and other valves for use with pneumatic tires and for other purposes.

Heretofore valves for pneumatic tires have been constructed either as cot-valves, which are inserted into a tubular cot projecting from the tire and fastened therein by winding wire around the cot, or as shoe-valves, which are fastened to the tire by having a flanged end or shoe inserted within the tire and an outer nut screwing against the tire to clamp it between the nut and shoe, and thereby fasten the valve to the tire. The essential parts of the valve proper are or may be the same in both constructions.

My present improvements are applicable to valves of either form or of any other equivalent or suitable form, but for convenience will be shown and described as applied to the usual shoe-valve.

My present improvements aim to provide a valve especially applicable for pneumatic tires which shall be simple in construction, effective in operation, and which can be readily taken apart to permit repairing or replacing any working parts by an ordinary user.

To this end in carrying out the preferred form of my invention I provide a valve-shell, a plug fitting therein and having a projection toward the valve chamber and shell, a flexible tube supported on the inner end of the plug fitting over said projection and extending into the valve-chamber, and a valve proper seating against the end of said tube and having a stem extending through the tube and plug and having preferably a conical portion entering and expanding the tube to close the valve, and I provide certain other features of improvement which will be hereinafter fully set forth.

Figure 1:
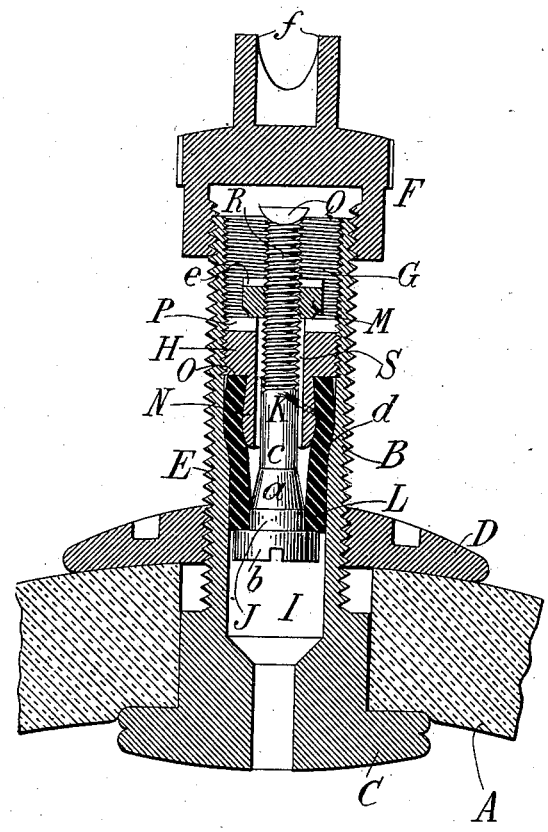
Figure 2:
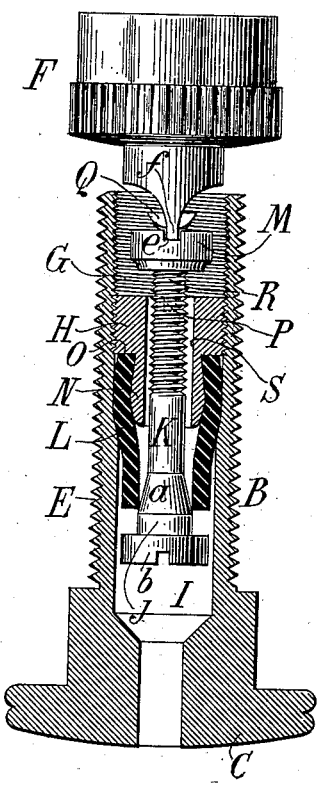

In the accompanying drawings, Figure 1 is an axial section of a tire-valve and its cap constructed according to the preferred form of my invention, the parts being shown in the closed position; and Fig. 2 is a similar view, the cap being shown in elevation and inverted and the valve being shown as held open by the cap.

Referring to the drawings, let A indicate a pneumatic tire or other article; B, a valve-tube coupled thereto; C, the shoe or flanged end of the tube; D, the nut screwing on the outer thread E of the tube and clamping it to the tire; F, the cap screwing on the end of the tube; G, a screw-threaded socket in the outer end of the tube; H, a plug screwing into this socket; I, a valve-chamber within the tube; J, the valve proper; K, its stem; L, the valve-seat, and M a nut screwing on the stem.

According to my present improvements the valve-seat L is a flexible or rubber tube supported on the inner end of the plug H, and the valve proper, J, extends through this tube and compresses it against the walls of the valve-chamber I and preferably also seats on the end of the tube and compresses it toward the plug H, for which purposes the valve proper consists of a tapering, conical, or bulging portion *a* for compressing the tube outwardly and a lateral projecting portion *b* for engaging the end of the tube, both suitably formed and connected to properly perform their respective functions. The end of the stem K where it meets the valve proper preferably consists of a cylindrical portion *c* of less diameter than the internal diameter of the rubber tube, so that when the valve proper is moved inwardly and the stem is opposite the tube there will be a space between the rubber tube and stem for the passage of air; but when the parts are moved outwardly against the tube the latter will be compressed both radially and longitudinally between the valve proper, the valve-chamber, and the plug H, and passage of air will be prevented.

I prefer to form the chamber I with a tapering or other suitable seating-face *d* between the chamber and the socket G and to clamp the seating-tube L tightly against this face by the plug H. I prefer to form a projection N on the inner side of the plug H, which projection starts from the shoulder O on the plug and is preferably bulbous or tapering near its end and contracted near the shoulder, over which projection the rubber tube is fastened or stretched and between which and the wall $d$ the tube is compressed when the plug is screwed into the shell.

The plug preferably screws entirely within the tube B and has on its outer side a slot P, in which a screw-driver may be inserted to screw the plug in or out.

The valve is preferably coupled to the plug, as by having a small head Q formed on the end of its stem, so that when the valve, plug, and rubber tube are removed from the shell there is no danger of loss of either. The rubber tube can be stretched over the head of the valve and placed on the end of the plug without requiring separation of the plug and valve-stem. The valve-stem is preferably adapted to draw the valve proper to a closed position by being provided with a screw-thread R, on which is removably mounted a nut, which nut has a slot $e$, in which the screw-driver $f$ of the cap F engages. Thus the nut can be screwed along the stem to free it or to set the valve proper tight against the rubber tube, as desired. The screw-driver $f$ is shown as consisting of two prongs formed on the cap F, with a space between them for receiving the end of the stem K; but any other form of screw-driver can be employed. When the nut M is used on the stem, or when the latter projects at the outer side of the plug H, it will be advisable to use a similar construction of screw-driver adapted to pass over the stem and nut for engaging and adjusting the plug within the socket G.

In use as a tire-valve when the tire is to be inflated the cap F is removed and the valve proper, if the nut M is used, is freed by unscrewing this nut, after which a pump-nozzle may be applied to the end of the shell B and air blown into the valve through the tire. The air will pass through the conduit S, traversing the plug, and then down between the valve proper and the rubber tube L and through the valve-chamber. The slots P will allow the air to pass under the nut M. The projecting head $b$ of the valve proper will guide the latter within the valve-chamber. When the pump is stopped, the valve proper will be instantly and automatically seated by the outflowing air, which as it strikes the head $b$ will force the valve proper into the rubber tube, thereby closing the tube and expanding the end of it laterally against the casing. After the tire is inflated the air may be held by the forcing of the valve proper against the rubber tube, or the valve proper may be for further security drawn against the rubber tube by means of the nut M. As an additional precaution and to protect the parts from dust the cap F will be applied over the end of the shell, as shown in Fig. 1.

In case of injury to the rubber tube, which, it will be seen, is the only part of the valve liable to wear or impairment, the plug and attached parts can be removed, the rubber tube taken off, and a new one applied by any ordinary person, whereupon upon restoring the parts the valve will be as good as new.

It will be seen that my invention provides improvements which can be readily and advantageously availed of, and it will be understood that the invention is not limited to the particular details of construction, arrangement, and combination set forth as constituting its preferred form, but that it can be employed according to such modifications as circumstances or the judgment of those skilled in the art may dictate without departing from the spirit of the invention.

What I claim is—

1. In air and other valves, a casing having a valve-chamber, a flexible tube having an end in said chamber and having an air-passage through it, and a valve proper pressing against such end to close the passage therethrough.

2. In air and other valves, a casing having a valve-chamber, a flexible tube having an end projecting into said chamber and having an air-passage through it, and a valve proper pressing against such end to close the passage therethrough.

3. In air and other valves, a casing having a valve-chamber, a flexible tube held in said casing and having an end in said chamber and having an air-passage through it, and a valve proper pressing against such end to close the passage therethrough.

4. In air and other valves, a casing having a valve-chamber, a plug coupled to said casing, a flexible tube held in said casing by said plug and having an air-passage through it, and having an end in said valve-chamber, and a valve proper pressing against such end to close the passage therethrough.

5. In air and other valves, a casing having a valve-chamber, a plug coupled to said casing having a neck, a flexible tube held in said casing by said plug and surrounding said neck, and having an end in said chamber, and a valve proper pressing against such end to close the passage therethrough.

6. In air and other valves, a casing having a valve-chamber, a plug screwing to said casing, a flexible tube held in said casing by said plug, and having an end in said chamber, and a valve proper pressing against such end to close the passage therethrough.

7. In air and other valves, a casing having a valve-chamber, a plug screwing in said casing and having a neck, a flexible tube held in said casing by said plug, surrounding said neck, and having an end in said chamber, and a valve proper pressing against such end to close the passage therethrough.

8. In air and other valves, a casing having a valve-chamber, a plug screwing in said casing and having a neck, a flexible tube held in said casing by said plug, surrounding said neck, and having an end in said chamber, a valve proper pressing against such end to close the valve, and a valve-stem passing through said plug.

9. The combination with a valve-shell having an open end of a cap having a screw-threaded lower end for screwing on said shell, a solid top, and a projection above said top for entering such shell, and having screw-driver provisions at its sides and a central socket.

10. The combination with a valve-shell having an open end of a cap having a screw-threaded lower end for screwing on said shell, a solid top and a hollow projection above said top for entering such shell, and having screw-driver provisions.

11. The combination with a valve-shell having an open end of a cap having a screw-threaded lower end for screwing on said shell, a solid top and a projection above said top for entering such shell, said projection having transverse notches.

12. The combination with a valve-shell having an open end of a cap having a screw-threaded lower end for screwing on said shell, a solid top, and a projection above said top for entering such shell, said projection having diametrically opposite projections.

13. The combination with a valve-shell having an open end of a cap having a screw-threaded lower end for screwing on said shell, a solid top, and a hollow projection above said top for entering such shell, said projection having a reduced diameter at its upper end, and having diametrically opposite projections on said end.

14. In air and other valves, a casing having a hollow interior, in combination with a flexible tube fastened to said casing and having an end projecting into its interior, and a valve proper within the casing seating on the inner end of said tube and pressing against such end to close the valve.

15. In air and other valves, a valve-casing having a hollow interior, in combination with a tubular plug removably fastened to said casing, a flexible tube compressed between said casing and plug around its periphery at one point to make a leak-tight joint, and having an end extending inwardly into said casing and constituting a valve-seat, and a valve proper engaging such end and pressing against it to close the valve.

16. As a new article of manufacture for tire and other valves, a tubular plug having a nipple adapted to be fastened within a valve-casing, a flexible tube sprung over said nipple and projecting inwardly of the end thereof for constituting a packing-washer around said nipple, and a valve-seat inwardly thereof, and a valve proper seating against the inwardly-projecting end of said tube.

17. As a new article of manufacture for tire and other valves, a tubular plug having a nipple adapted to be fastened within a valve-casing, a flexible tube sprung over said nipple and projecting inwardly of the end thereof for constituting a packing-washer around said nipple, and a valve-seat inwardly thereof, and a valve proper seating against the inwardly-projecting end of said tube and irremovably coupled to said plug.

In witness whereof I have hereunto signed my name in the presence of two subscribing witnesses.

GEORGE H. F. SCHRADER.

Witnesses:
  GEORGE H. FRASER,
  THOMAS F. WALLACE.